April 16, 1929.　　A. A. LINDLEY　　1,709,624
FITTING
Filed June 21, 1926
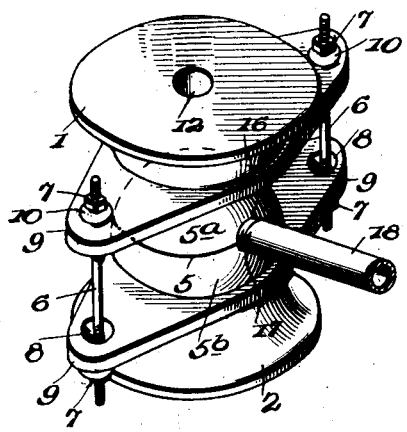
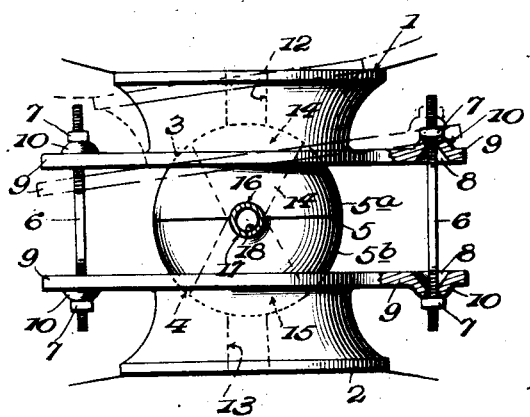
INVENTOR
A. A. Lindley.

Patented Apr. 16, 1929.

1,709,624

UNITED STATES PATENT OFFICE.

ALVA A. LINDLEY, OF SPOKANE, WASHINGTON.

FITTING.

Application filed June 21, 1926. Serial No. 117,647.

This invention relates to an improvement in fittings and connections of the type forming the subject-matter of my prior Patent No. 1,544,644, granted July 8, 1925, and the object of the present invention is to provide a fitting of this character which may be used as a three-way fitting without sacrificing any of the advantages and capacities of the type of fitting shown in my prior patent.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a perspective view showing the improved fitting,

Figure 2 is a view thereof in side elevation, and

Figure 3 is a view thereof in transverse vertical section on the line 3—3 of Figure 2.

Referring to the drawings it will be seen that the fitting includes coupling members 1 and 2 which may be connected to boilers or to any other devices to be coupled. The confronting faces of the coupling members are provided with sockets or seats, designated at 3 and 4, respectively. A ball designated generally at 5 is provided and may consist of two semi-spherical sections, designated at $5^a$ and $5^b$, the section $5^a$ being received on the seat 3 and the section $5^b$ being received on the seat 4. When the ball is constructed of two semi-spherical sections, as it preferably is, although the ball may be made of one piece, the engaging faces of the ball sections are machined or otherwise formed to provide a ground joint between the engaging faces of the ball. The periphery of the ball and the surfaces of the seats 3 and 4 are also machined to provide a ground joint between their engaging surfaces.

The coupling members are brought into the desired engagement with the balls by means of clamping bolts 6 and nuts 7, the bolts 6 extending through openings 8 provided in opposed ears 9 integrally formed with the coupling members and the nuts 7 engaging rounded bosses 10 provided on the ears 9. The rounded bosses permit the bolts to position themselves to bring the desired strain on the parts even though the coupling members be slightly angled with respect to each other. As shown to advantage in Fig. 3 the coupling members 1 and 2 have centrally located openings, designated at 12 and 13, respectively, and these openings 12 and 13 are aligned with frusto-conical openings 14 and 15 provided in the sections $5^a$ and $5^b$ of the ball 5. The sections $5^a$ and $5^b$ of the ball 5 also have complementary semi-cylindrical openings 16 and 17 which extend from the periphery of the ball to the openings 14 and 15 and which preferably receive and engage an externally threaded coupling pipe 18. The provision of the openings 16 and 17 and of the pipe 18 converts the fitting into a three-way fitting or connection without in any way impairing the capacity of the fitting for adjustment and for reliable and effective operation in all adjustments.

I claim:—

1. In a fitting of the class described, a pair of coupling members having axial openings and opposed seats around the inner ends of said openings, a ball mounted in said seats and composed of semi-spherical sections, each provided with a frusto-conical opening with the small ends of the openings arranged toward each other, said sections also having complementary semi-cylindrical openings extending from the periphery of the ball to the openings at the center thereof whereby a three way fitting is provided.

2. In a fitting of the class described, a pair of coupling members having axial openings with seats around the inner ends of said openings, said coupling members being opposed and having their seats confronting, a ball consisting of semi-spherical sections mounted in said seats, the meeting faces of said ball having opposed semi-cylindrical grooves extending from the periphery of the ball sections to a point at the center, said ball sections having registering openings extending through them in a plane at right angles to said grooves whereby a T-joint may be formed from an adjustable ball joint.

ALVA A. LINDLEY.